United States Patent [19] [11] 3,807,125
Enrich [45] Apr. 30, 1974

[54] APPARATUS AND METHOD FOR PRODUCING SEEDING CONTAINERS

[76] Inventor: Carlos William Enrich, 4952 Ruby St., British Columbia, Canada

[22] Filed: July 17, 1972

[21] Appl. No.: 272,311

[52] U.S. Cl. .................... 53/28, 47/58, 53/124 CC, 53/177
[51] Int. Cl. .............................................. B65b 9/06
[58] Field of Search ..... 53/124 E, 124 CC, 28, 177, 53/178, 180; 17/34, 40, 41; 47/1, 56, 58; 93/82; 156/200, 461, 464, 466

[56] References Cited
UNITED STATES PATENTS

| 3,216,307 | 11/1965 | Griffith | 53/28 X |
| 3,606,726 | 9/1971 | Spertus et al. | 53/28 |
| 2,883,813 | 4/1959 | Shannon | 53/180 |
| 2,828,590 | 4/1958 | Swartz et al. | 53/28 |
| 3,055,731 | 9/1962 | Loliger | 53/28 X |
| 3,414,936 | 12/1968 | Lugiewicz | 17/40 |

Primary Examiner—Robert L. Spruill
Attorney, Agent, or Firm—Carver and Company

[57] ABSTRACT

Apparatus and method for producing an essentially continuous length of seeding container containing absorbent rooting medium to accept seed. Apparatus has cylindrical tube containing auger, infeed opening in tube is spaced from outer end, and accepts rooting medium which is extruded through tube by auger. Forming means encloses tube and forms a sheet material into container tube in which edges of sheet extend radially as fins from tube. Seaming means secures fins together producing a lap seam and feed means engages seam drawing container tube at speed synchronized with extrusion of rooting medium from tube. If required wetting means introduces water into rooting medium prior to forming container tube.

10 Claims, 7 Drawing Figures

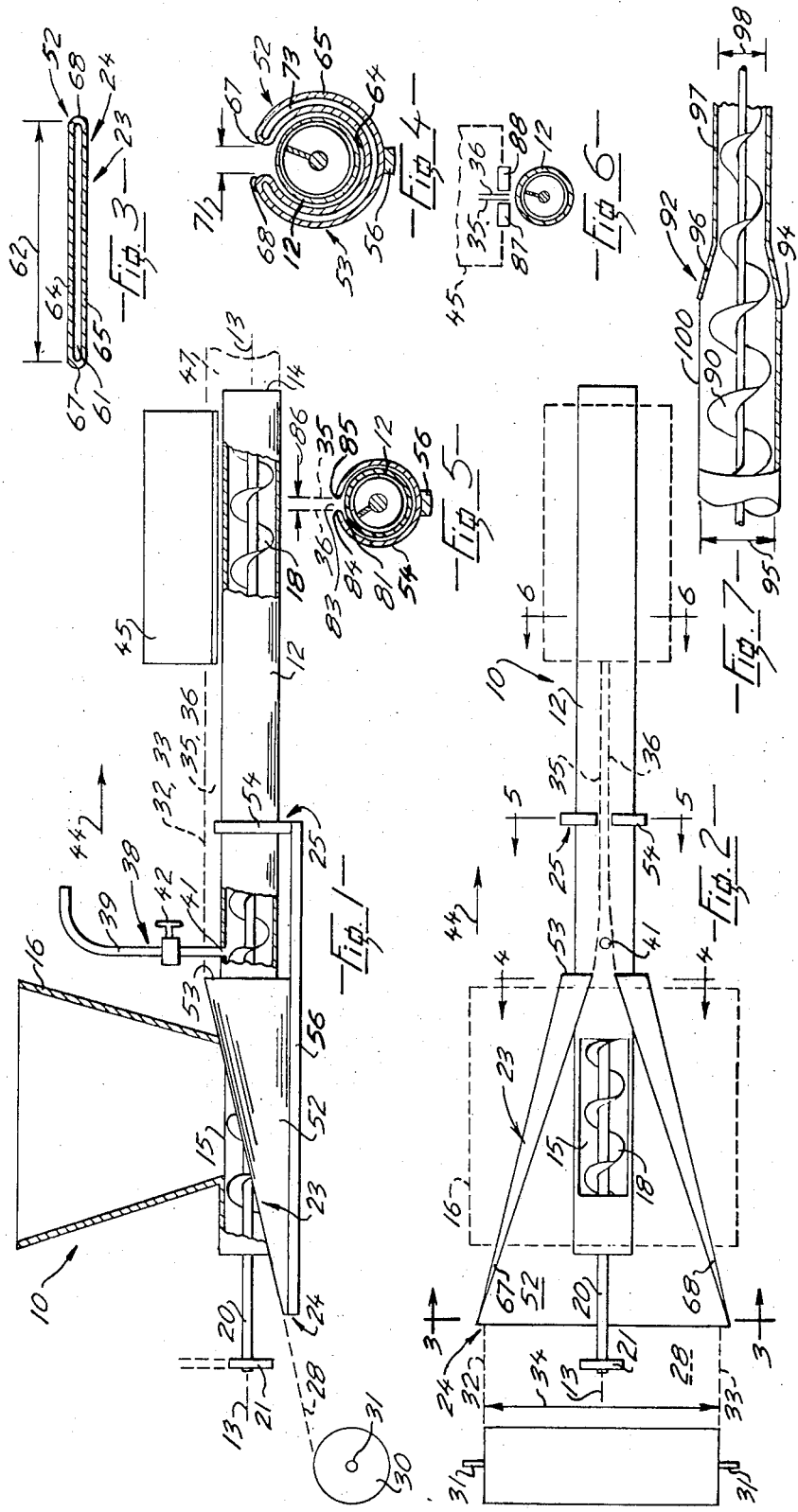

APPARATUS AND METHOD FOR PRODUCING SEEDING CONTAINERS

BACKGROUND OF THE INVENTION

1. Field of the Invention

The invention relates to apparatus and method for producing seeding containers in an essentially continuous length, the seeding containers being particularly adapted for, but not limited to, reforestation.

2. Prior Art

It is well known to provide a seeding container adapted to contain an absorbent rooting medium to accept a seed. With some prior art containers, when the seed as germinated and produced a seedling with a root ball, the container is removed from the root ball and the latter is inserted in a prepared hole in a site. If desired the seeding container can be re-used. Other seeding containers are expendable and, prior to planting the seedling in the container, the container is ruptured to permit the seedling roots to pass through walls of the container permitting growth. Both types of containers above are generally relatively expensive and require much labor for filling the containers with rooting medium. Containers known to the present inventor are filled with rooting medium by a batch process which has disadvantages inherent in any batch process.

SUMMARY OF THE INVENTION

The invention reduces difficulties of the prior art by providing an apparatus and method for continuous production of seeding containers filled with rooting medium, the containers being made from a relatively cheap container material, the invention requiring relatively little labor for operation.

Apparatus according to the invention produces a container having a side wall formed from a strip of flexible sheet material having spaced parallel edges, the apparatus including a cylindrical tube having an open outer end and an infeed opening spaced from the outer end. An auger extends through the tube and when rotated extrudes rooting medium introduced into the tube through the infeed opening. A forming means has an inner end which accepts the sheet material from a supply when the sheet material is generally flat and an outer end which encloses the tube and forms the sheet material into a cylinder. After the sheet material has passed through the forming means, portions of sheet material adjacent the outer edges are brought together so as to form a pair of fins extending radially of the tube. A seaming means cooperates with the pair of fins and secures the fins together producing a lap seam thus forming a container tube from the sheet material. The auger is rotated so as to extrude the rooting medium through the tube as a continuous column and feed means engaging the seam draws the container tube at a speed synchronized with speed of extrusion of the column of rooting medium.

A detailed disclosure following related to drawings, described apparatus and method according to the invention, which, however, is capable of expression in apparatus and method other than that specifically described and illustrated.

DESCRIPTION OF THE DRAWINGS

FIG. 1 is a simplified side elevation of an apparatus according to the invention, some portions being removed to show interior detail.

FIG. 2 is a simplified plan view of the apparatus of FIG. 1, some portions being removed, FIG. 3 is a simplified section on line 3—3 of FIG. 2, some portions being removed, FIG. 4 is a simplified enlarged section on line 4—4 of FIG. 2, some portions being removed, FIG. 5 is a simplified enlarged section on 5—5 of FIG. 2, portions of apparatus being removed, FIG. 6 is a simplified section on line 6—6 of FIG. 2, some portions shown diagrammatically, FIG. 7 is a fragmented side elevation of a portion of an alternative tube and associated auger, portions being removed.

DETAILED DISCLOSURE

FIGS. 1 and 2

An apparatus 10 according to the invention has a cylindrical tube 12 having a longitudinal axis 13 and an open outer end 14. The tube has an opening 15 in a side wall thereof, best seen in FIG. 2, the opening cooperating with a hopper 16 which extends above the tube 12. The hopper holds rooting medium such as peat moss and sand and serves as a rooting medium supply means. An auger 18 having a central axis concentric with the axis 13 extends through the tube and has an infeed end 20 extending clear of the tube and adapted to be rotated by rotating means 21 cooperating with the auger, for instance a belt engaging a pulley, the belt being driven by an electric motor (not shown). The auger has a constant pitch and thus feeds rotating medium along the tube 12 at an essentially constant density i.e. with little variation in compaction.

A forming means 23 adjacent the hopper 16 has an inner end 24 and an outer end 25, and is adapted to accept sheet material 28 (broken outline) from a roll 30 of sheet material, the roll serving as a means for supplying the sheet material. The roll 30 is journalled on a spindle 31 so that the roll rotates freely as material is drawn off the roll. The sheet material has spaced parallel edges 32 and 33 defining a width 34 of the sheet, the edges being shown in broken outline only. When the material has passed through the forming means 23, portions of sheet material adjacent the edges 32 and 33 are brought together at the other end 25, the portions forming a pair of fins 35 and 36 extending generally radially of the tube. Thus the width 34 is greater than the circumference of the tube 12, providing excess sheet material for the fins, the fins being shown diagrammatically in FIG. 5.

A wetting means 38 includes a pipe 39 communicating with an interior of the tube 12 through an opening 41 in the side wall of the pipe (see FIG. 2), the pipe supplying water as required to the rooting medium in the tube. The pipe has an inner end essentially flush with an inner sidewall of the tube 12 to prevent interference with the auger. The pipe includes a metering means 42 which regulates flow of water from a supply (not shown) into the pipe. Wetting means as above to inject water into the medium after it has been fed through the hopper is a preferred means of attaining a desired water content of the rooting medium. Importance of such water content is outlined later.

Rotation of the auger is such that the rooting medium in the hopper fed through the opening 15 to the auger is forced in a direction shown by an arrow 44 along the tube to leave the open end 14 as a continuous column of rooting medium extruded by the auger. The auger is journalled in bearings (not shown) adjacent the inner end, the outer end thus being cantilevered freely, clearance between the auger and the tube being sufficient to prevent material deviation of the central axis of the auger from the axis 13 of the tube. The auger is a relatively close fit to an inner side wall of the tube 12 and both the tube and auger are subject to rapid wear due to abrasive nature of the rooting medium. If required, a disposable, relatively soft, inner sleeve is held as a close fit in the tube 12 and is a similar close fit around the auger, the tube being easily replaced when excessively worn. The disposable inner sleeve is not shown and has particular advantage when extruding rooting medium having high grit content which produces corresponding high wear rates.

A seaming means 45 is provided downstream of the forming means 23 and cooperates with the fins 35 and 36, securing the fins together producing a lap seam which forms a container tube from the sheet material, a portion 47 of such a tube being shown in broken outline. The fins are secured together by welding if a thermplastic sheet material is used e.g., polyethylene, or by bonding with adhesive if the sheet material is adaptable to bonding. The seaming means 45 is a conventional food package seaming machine in which the fins of sheet material are squeezed together between heated rollers so as to produce local fusion, and while still under pressure are cooled so as to produce a seam. A suitable machine is manufactured by Doughboy Incorporated (registered trade mark), a corportion of New Richmond, Wisconsin, USA and has a model number HS-C. A particular advantage of the Doughboy machine is that the seaming means also provides a feed means which engages the seam and draws the container tube from the tube 12 at a feed speed which is adjustable for synchronization purposes. Thus the seaming machine serves as a feed means and also as a seaming means. Clearly if a different seaming device without feed means were to be used, a separate feed means would be required to draw the container tube from the apparatus.

The forming means 23 has essentially two main portions, namely a hollow-sectioned curved fan-shaped member 52 and a generally C-shaped member 54 essentially enclosing and spaced from the tube. The inner end of the member 52 serves as the inner end 24 of the forming means and the outer end of the forming means is the C-shaped member 54, the members being secured together by a longitudinal strip 56. As seen in FIG. 2, edges of the member 52 converge from the inner end 24 to an outlet end 53. The outlet end 53 is spaced from the C-shaped member 54, the opening 41 being spaced between the end 53 in the C-shaped member 54. The edges of the sheet material (broken lines) converge smoothly from the outlet end 53 to the member 54, the pipe 39 (FIG. 1) being straddled by the edges. A cut-off means (not shown) is provided downstream of the end 14 and cuts the length of tube into short lengths as required.

FIGS. 3 and 4

As seen in FIG. 3, the inner end 24 of the forming means 23, that is the inner end of the member 52, has an elongated opening 61 having a width 62 greater than the width 34 of the sheet material 28. The opening is defined by generally plane upper and lower walls 64 and 65 spaced apart and secured at outer edges by side wall 67 and 68, space between the upper and lower walls being sufficient to accept the sheet material (not shown).

As seen in FIG. 4, at the outlet end 53 the side walls 67 and 68 are spaced at a spacing 71 which is somewhat greater than a corresponding spacing 86 of the C-shaped member 54 (see FIG. 5). Difference between the spacings 71 and 86 is sufficient to permit the smooth convergence of the sheet material from the member 52 to the C-shaped member 54. The upper and lower walls 64 and 65 are curved so as to form concentric C-shaped walls spaced apart and secured at outer edges by the side walls 67 and 68. The elongated opening 61 thus has been transformed into a C-shaped passage 73 substantially enclosing and spaced from the tube and defined by the walls 64, 65, 67 and 68 and having sufficient width to accept sheet material with negligible folding.

FIG. 5

The C-shaped member 54 essentially encloses the tube 12 and is spaced from the tube sufficiently to define an essentially annular passage 81 having sufficient width to accept the sheet material and having an open upper end 83 defined by edges 84 and 85 of the member 54. The spacing 86 between the edges 84 and 85 is sufficient to form an open portion to accept the pair of fins 35 and 36 (shown in broken ouline) and thus complete the process of forming the sheet material from a flat sheet into an essentially continuous tube in a condition for seaming by the seaming means 45.

FIG. 6

The seaming means 45 has a pair of spaced roll means 87 and 88 which accept the fins 35 and 36. The rolls are powered, thus serving also as feed means for the container tube, and are urged together so as to clamp the fins together prior to seaming. If thermoplastic sheet material is used, heating means are supplied to heat the roll means or other bonding means is provided. The feed means are incorporated into the seaming means to transmit a force to the seam to draw the container tube from the tube 12 in the direction of arrow 44 (see FIGS. 1 and 2).

OPERATION

To set up the machine for operation, a portion of the sheet material 28 on the roll 30 is unwound and threaded by hand into the elongated opening 61 at the inner end 24 of the forming means 23, the sheet material being pushed through the member 52 until it emerges from the outlet end 53. At this the C-shaped the sheet material has been roller from a generally flat sheet into a C-shaped sheet and is confined within theC-shaped passage 73 and substantially encloses the tube 12. It is then threaded by hand between the tube 12 and the C-shaped member 54, forming the fins 35 and 36, and is inserted into the seaming means 45. The seaming means is then started and is operated at a slow feed rate so that the roll means engages the pair of fins and pulls the sheet material slowly from the roll. Undesirable creases in the sheet that may occur between the fan-shaped member 52 and the C-shaped member 54 are removed by hand.

When the wetting means 38 is used the hopper 16 is filled with an essentially dry absorbent rooting medium, which as aforesaid can be peat moss and sand, or other rooting medium appropriate to the type of seedling to be grown. The auger 18 is then started and rooting medium from the hopper 16 is fed along the tube 12. The metering means 42 is adjusted so that water is admitted to the dry mix at a rate sufficient to produce a substantially solid mass of rooting medium being extruded as a column from the end 14 of the tube. Water content of the rooting medium in the container tube is attained so that when the container tube is cut by the cut-off means the water binds the rooting medium together to prevent the rooting medium from falling from a short length of seeding container. Water content is discussed in detail later.

Speed of rotation of the auger is adjusted so that rate of extrusion of the column of rooting medium is synchronized with longitudinal feed of the seaming means 45. Simple adjustments as below are made to either auger speed or feed speed of the seaming means to attain the desired density of rooting medium. If the rate of extrusion of the column of rooting medium, which is determined by speed of rotation of auger, is too high relative to feed speed of container tube, the rooting medium is compressed excessively in the container tube and is unsatisfactory for rooting purposes. If the rate of extrusion of rooting medium is slower than feed speed of the container tube, voids are produced in the medium producing a container which is insufficiently filled and which does not hold the rooting medium so that, when the container tube is cut into short lengths and arranged vertically, the rooting medium tends to fall from the lower end thereof. The cut-off means (not shown) has a frequency of cutting dependent on feed speed and cuts the essentially continuous length of seeding container into short lengths of two or three inches and these are stored in flat trays with the cut ends disposed in horizontal planes.

A seed is introduced into each short length of seeding container by conventional means (not shown), and germination of the seed commences under suitable conditions to produce a seedling. When the seedling is a few inches high, it is ready to be planted in the permanent site. Prior to planting the seedling, a hole is punched in the ground and the side wall of the seeding container is split to permit the roots to grow beyond the constraints of the seeding container. Yield from such types of disposable seeding containers is well known to be higher than any other known way of reforestation.

Thus, to summarize the method of producing the essentially continuous length of seeding container, the rooting medium is extruded in an elongated continuous column from the tube, and essentially simultaneously therewith sheet material from a supply is formed around the column. Portions of the sheet material adjacent the edges extend radially from the column as fins and are brought into contact with each other. The fins are pressed together and secured producing a lap seam and an axial feed is applied to the fins to draw the column at a speed synchronized with the speed of extrusion of the elongated continuous column of rooting material.

ALTERNATIVES AND EQUIVALENTS

The apparatus 10 of FIG. 1 has the wetting means 38 to increase moisture content of the initially relatively dry rooting medium in the container tube 12. Such an arrangement is used when the rooting medium is supplied into the hopper with a controlled low moisture content insufficient for binding the rooting medium together or for seeding purposes.

As previously stated one example of rooting medium is a mechanical mixture of two raw materials, namely peat moss and sand. The rooting medium can have a percentage of sand within a range from ten percent to fifty percent by volume, the balance being made up with uncompressed peat moss. The raw materials are normally supplied relatively dry with a moisture content which is lower than required, and thus additional water is added to increase the water content. If the wetting means 38 is not provided in the apparatus, before the rooting medium is fed into the hopper the water content is increased to be within a particular narrow range. The particular water content will vary with the hopper arrangement, but a typical range of water content is between 5 and 8 percent by volume of the medium. The additional water is usually added when the two raw materials are mixed and accurate control of the additional water is required to attain the mixture having a moisture content with the narrow range. If the water content is increased beyond the upper limit above the medium feeds erratically through the hopper and produces unsatisfactory containers. If water content is decreased below the lower limit, the containers dry excessively within a short time. However seeding containers filled with rooting medium having a moisture content within the range as above will still tend to dry out if the containers are stored for more than a few days without being used. When dried out, the rooting medium is difficult to wet as it has a relatively impermeable surface. Thus containers produced by an apparatus without a wetting means have a relatively short storage life. Notwithstanding the limitation on storage of the filled containers, with suitable adjustment of feed speeds such an arrangement is operative, and when the rooting medium in the hopper has a moisture content within the narrow range the wetting means 38 can be eliminated.

When wetting means 38 is used as shown, the sand and peat moss are mixed dry and fed into the hopper dry, water being added downstream of the hopper in an amount up to a maximum of about 80 percent by volume of dry medium. This produces a relatively wet mixture, and thus the containers can be stored for many days without excessive drying out. To increase storage life of the containers before the mixture dries, ends of the containers are watered to maintain desired water content, the surface of the medium being permeable when the rooting medium is wet and thus reduces difficulty of wetting.

FIG. 7

An alternative auger 90 is shown within an alternative tube 92. The tube 92 has a large diameter portion 94 having a large internal diameter 95 joined by a reducing section 96 to a small diameter portion 97 having a small internal diameter 98. The portion 94 has an opening 100 which communicates with a rooting medium supply means such as a hopper (not shown). As can be seen, the auger has a diameter complementary to the portion of the tube in which it rotates. Thus, in the portion 94 the diameter of the auger is somewhat less than the diameter 95, and in the portion 97 the diameter of the auger is somewhat less than the diameter 98, thus the auger has a large diameter adjacent the opening and a smaller diameter downstream of the opening. Transition between the two portions of the auger is effected by tapering a portion of the auger so that there is no interference with the reducing section 96.

One advantage of the auger 90 over the auger 18 is that for the same diameter of container tube a higher rate of extrusion can be attained. The auger 18 has a constant diameter and rate of extrusion of the column of rooting medium is limited by rate of feeding rooting medium from the hopper, through the opening 15 into a portion of the auger below the opening 15. Increase of auger rpm beyond a particular maximum, which is limited on the rate of feed of rooting medium through the opening, produces a column of rooting medium which has voids and is loosely packed and is thus unsatisfactory. By providing an auger of large diameter adjacent the opening in the tube, rate of feed of rooting medium is increased into the auger and, thus higher rate of extrusion can be attained without increase of auger rpm. Such an auger is termed a multi-diameter auger, pitches of the auger of each diameter being essentially equal.

I claim:

1. An apparatus for producing an essentially continuous length of seeding container containing an absorbent rooting medium, the container having a side wall produced from a strip of flexible sheet material having a width defined by spaced parallel edges, the apparatus including:
   a. a cylindrical tube having a longitudinal axis, an open outer end, and an infeed opening spaced from the outer end, the outer end positioned downstream from the infeed opening,
   b. an auger extending axially through the tube,
   c. sheet material supply means for supplying an essentially continuous length of the sheet material,
   d. forming means having an inner end to accept the sheet material from the supply means, and an outer end adapted to bring together portions of the sheet material adjacent the edges, the portions of sheet material forming a pair of fins extending generally radially of the tube; the forming means having a hollow-sectioned curved fan-shaped member extending from the inner end of the forming means, the fan-shaped member having an inlet end having a generally flat-sectioned tube having an opening having sufficient width to accept the sheet material, and an outlet end formed of two concentric C-shaped walls spaced so as to form a C-shaped passage concentric with and substantially enclosing the tube, the passage having sufficient width to accept freely the sheet material; the outer end of the forming means having a generally C-shaped member spaced from the outlet end of the fan-shaped member and essentially enclosing and spaced from the tube so as to define an essentially annular passage having sufficient width to accept the sheet material, the C-shaped member having an open portion defined by spaced edges of the C-shaped member, and open portion accepting the fins of the sheet material,
   e. a pipe having an inner end communicating with an interior of the tube and disposed between the infeed opening of the tube and the outer end of the forming means, the inner end being essentially flush with an inner sidewall of the tube to prevent interference with the auger, the pipe being connected to a supply of water adapted to be fed to the tube,
   f. seaming means spaced from the tube and positioned downstream of the C-shaped member so as to cooperate with the pair of fins to secure the fins together producing a lap seam so as to form a container tube from the sheet material,
   g. feed means engaging the seam and adapted to draw the container tube from the apparatus at a feed speed,
   h. rotating means cooperating with the auger at a position upstream from the infeed opening and being adapted to rotate the auger,
   i. rooting medium supply means cooperating with the opening to supply rooting medium into the tube, so that when the sheet material extends through the forming means to the seaming means, rotation of the auger feeds relatively dry rooting medium from the rooting medium supply means into the tube to produce a continuous column of rooting medium passing through the tube at a speed synchronized with the feed speed of the container tube from the seaming means, and water is injected into the column of the rooting medium to moisten the rooting medium prior to seaming the container tube.

2. An apparatus as claimed in claim 1 in which:
   i. the generally flat-sectioned tube at the inlet end of the fan-shaped member has an elongated opening defined by generally plane upper and lower walls spaced apart and secured at outer edges by side walls, space between the upper and lower walls and the side walls being sufficient to accept the sheet material,
   ii. the C-shaped passage at the outlet end of the fan-shaped member is defined by concentric C-shaped walls spaced apart and secured at outer edges by the side walls, space between the upper and lower walls and the side walls being sufficient to accept the sheet material.

3. An apparatus as claimed in claim 1 in which a longitudinal strip extends from the fan-shaped member to the C-shaped member so as to secure the C-shaped member in spaced relationship relative to the fan-shaped member. radially from the tube.

4. An apparatus as claimed in claim 3 in which:
   i. the C-shaped member is spaced from the tube at a spacing approaching thickness of the sheet material.

5. An apparatus as claimed in claim 2 in which spacing between the side walls of the outlet end of the fan-shaped member is greater than spacing between the edges of the C-shaped member, so as to permit smooth convergence of the edges of the sheet material from the fan-shaped member to the C-shaped member so as to reduce folds.

6. An apparatus as defined in claim 1 in which the auger has a constant pitch.

7. An apparatus as defined in claim 1 in which:

i. the auger is a multi-diameter auger and has a large diameter adjacent the opening and a small diameter downstream of the opening.

ii. the tube has a large internal diameter complementary to the large diameter of the auger joined by a reducing section of relatively short axial length to a small internal diameter complementary to the smaller diameter of the auger.

8. An apparatus as claimed in claim 1 in which the pipe has a metering means to regulate flow of water into the tube.

9. An apparatus as defined in claim 2 in which a longitudinal strip extends from the fan-shaped member to the C-shaped member so as to secure the C-shaped member in spaced relationship relative to the fan-shaped member.

10. A method of producing an essentially continuous length of seeding container containing a moistened absorbent rooting medium, the container having walls produced from a strip of flexible sheet material having spaced parallel edges, the method including steps of:

a. extruding a relatively dry rooting medium as an elongated continuous column, b. essentially simultaneously forming sheet material around the column so that portions of sheet material adjacent the edges of the sheet form a pair of spaced fins which extend from the column, c. injecting water between the fins and into the column of rooting medium so as to moisten the rooting medium, d. bringing the fins into contact with each other, e. seaming the fins so as to produce a lap seam extending generally radially from the container, and simultaneously applying an axial force to the fins so as to draw the seeding container at a rate synchronized with the rate of extrusion of elongated continuous column.

* * * * *